United States Patent
Hoffmann et al.

[11] Patent Number: 5,992,727
[45] Date of Patent: Nov. 30, 1999

[54] APPARATUS FOR PRODUCING A SLEEVE-TYPE PRINTING FORM

[75] Inventors: Eduard Hoffmann, Bobingen; Johann Winterholler, Friedberg, both of Germany

[73] Assignee: MAN Roland Druckmaschinen AG, Offenbach am Main, Germany

[21] Appl. No.: 09/039,727

[22] Filed: Mar. 16, 1998

[30] Foreign Application Priority Data

Mar. 15, 1997 [DE] Germany .............................. 197 10 901

[51] Int. Cl.⁶ .................................................. B23K 37/00
[52] U.S. Cl. ......................... 228/6.1; 228/15.1; 228/56.5; 228/44.3
[58] Field of Search ............................. 228/4.1, 6.1, 15.1, 228/44.3, 47.1, 56.5; 219/121.63, 121.64, 385; 29/34 R

[56] References Cited

U.S. PATENT DOCUMENTS 3,775,586  11/1973  Flint et al. ........................... 219/121.63
5,149,934   9/1992  Haynie et al. ....................... 219/121.27

FOREIGN PATENT DOCUMENTS 90 14 204   1/1991  Germany .
43 11 078   3/1993  Germany .
43 38 467 C1 11/1993  Germany .
7-16679     1/1995  Japan .
7-186358    7/1995  Japan .

*Primary Examiner*—Samuel M. Heinrich
*Attorney, Agent, or Firm*—Cohen, Pontani, Lieberman & Pavane

[57] ABSTRACT

Disclosed is an apparatus for producing a sleeve-type printing form from a plate-shaped blank. The apparatus has a fixing device for fixing the uppermost plate-shaped blank of a stack of blanks as a flat raw form, a curving device for curving the flat raw form, and a welding machine by which the plate edges that constitute the beginning and end of the printing form can be welded by a laser beam. The apparatus includes a housing which is a radiation protective casing. The curving device and the welding machine are arranged in the housing, Outside of the housing, there is a layout table, and an opening is left in the housing above the layout table. A fixing frame to hold the plate-shaped blank can be moved between the layout table and the curving device by means of a linear drive, so that the entire production process for the sleeve-type printing form can be performed inside the housing, which can be sealed in a radiation-proof manner during the production process.

16 Claims, 5 Drawing Sheets

APPARATUS FOR PRODUCING A SLEEVE-TYPE PRINTING FORM

BACKGROUND OF THE INVENTION

The invention relates to an apparatus for producing a sleeve-type printing form from a plate-shaped blank with a device for fixing the plate-shaped blank as a flat raw form, a device for curving the raw form, and a welding machine by means of which the plate edges constituting the beginning and end of the printing form can be welded by means of a laser beam.

An apparatus of this type, which requires only the manual insertion of the plate-shaped blank, and which permits, after the insertion of the plate, the automatic curving and precise register-correct positioning of the plate ends to be connected or welded, is described in DE 43 11 078 C1.

To avoid having to cut the plate-shaped raw form to the correct length outside of the aforementioned apparatus by means of metal shears, DE 43 38 467 C1 suggests to improve the production process of the sleeve-type printing form in such a way that the plate-shaped raw form, whose width corresponds to the form cylinder, is cut roughly to a length greater than the printing form. The raw form, in a register-correct and curved state, is then cut correctly to length in the welding device with a laser beam serving as the cutting device. At least one waste piece is thereby created, which is then removed, and the two plate edges that constitute the beginning and end of the printing form are placed across from each other without overlap and are welded together.

It is known that electromagnetic radiation, from which the operating personnel must be protected, occurs during laser processes of this type.

The object of the invention is to provide an improved generic apparatus that provides complete radiation protection for the operating personnel before the laser process and also ensures such protection throughout the entire production process of the sleeve-type printing form, even during the removal of the sleeve-type printing form from the apparatus.

SUMMARY OF THE INVENTION

In the apparatus of the invention a curving device for curving the raw form and the welding machine are arranged in a housing which is in the form of a radiation protection casing. A layout table for the plate-shaped raw form is outside of the housing. The housing has an opening located above the layout table. The opening can be closed in a radiation-proof manner, so that the apparatus for fixing the plate-shaped blank in the form of a fixing frame, adjustable to the given raw form size, is movable out of the housing via the layout table by means of a linear drive for the register-correct accommodation of the raw form. The held raw form can be turned over by the fixing frame to the device for curving in the housing and the plate edges of the raw form can be processed by the welding machine with the opening in the housing closed.

The housing has a window that can be closed during the production process of the sleeve-type printing form. The finished printing form sleeve can be moved out of the housing through the window by means of a conveying mechanism arranged in the housing.

The various features of novelty which characterize the invention are pointed out with particularity in the claims appended to and forming a part of this specification. For a better understanding of the invention, its operating advantages and specific objects obtained by its use, reference should be had to the accompanying drawings and descriptive matter in which there is illustrated and described a preferred embodiment of the invention.

DESCRIPTION OF THE PREFERRED EMBODIMENT

Figure 1:
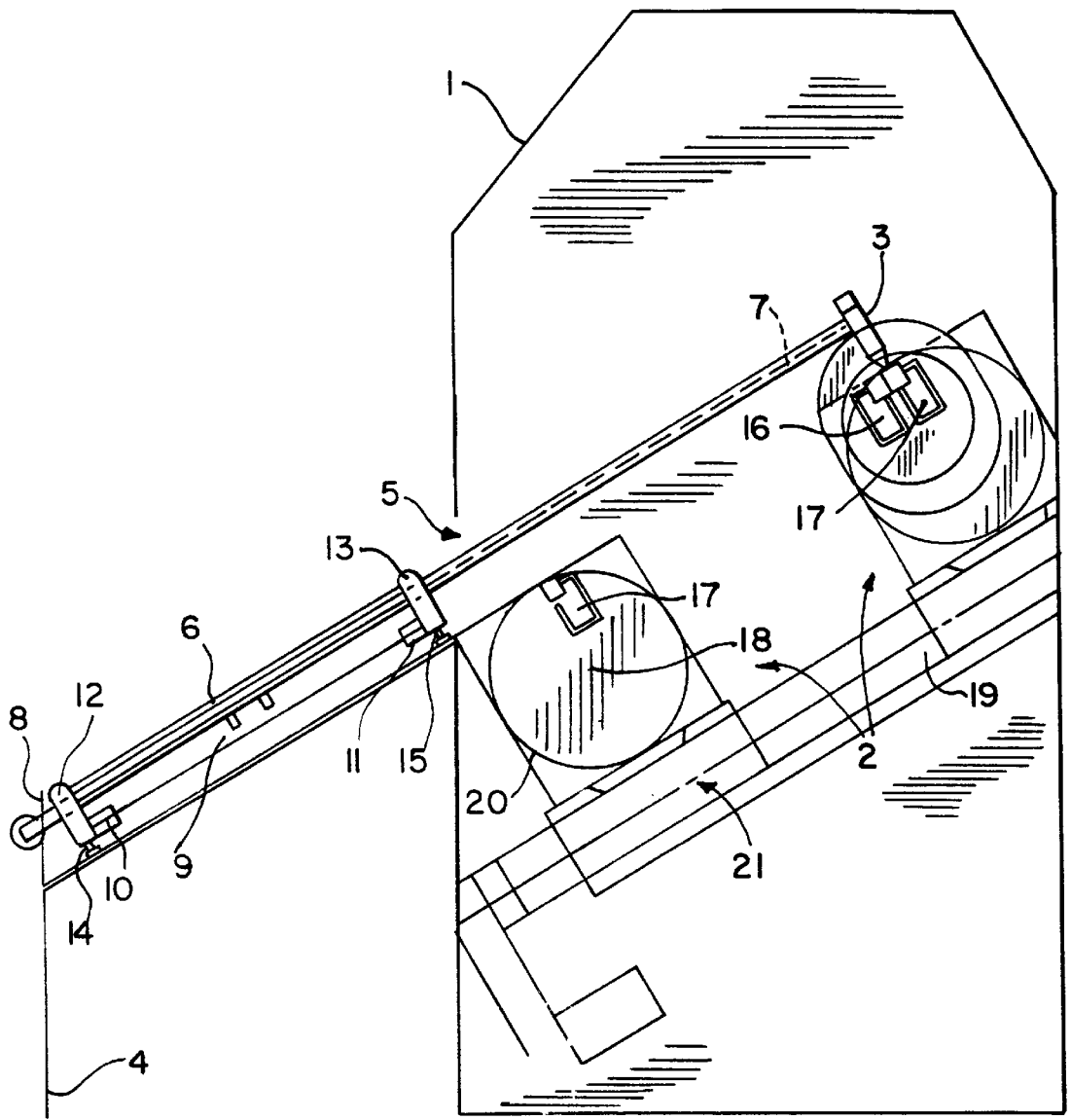
FIG. 1 is a side view of an apparatus according to the invention for producing a sleeve-type printing form.

Referring to FIG. 1, a housing 1, which is designed as a radiation protective casing and encompasses a curving device 2 for plate-shaped blanks and a welding machine 3 is shown. The radiation protective casing is metal, has no viewing slots, and has only covered doors. A layout table 4, on which plate-shaped blanks can be manually placed preferably in a pre-centered fashion in a trough, is located external to the housing.

The housing 1 has an opening 5 above layout table 4. Through the opening 5, a device, which may be in the form of a the fixing frame 6, can be moved out of the housing 1 via the layout table 4 by means of a linear drive 7. The fixing frame 6 holds the plate-shaped blank (i.e., the flat raw form) and is adjustable to the given plate size.

The fixing frame 6 comprises two holding strips, 10 and 11, on a carriage 9. The holding strips 10 and 11 can be adjusted to match the distance between the plate edges to be connected, and can then be placed longitudinally on the respective plate edges. Strips 10 and 11 can be lowered onto the raw form by means of lever elements 12 and 13, which have already been described in DE 43 11 078 C1 and can be operated, for example, hydraulically or pneumatically. The fixing frame 6 further comprises a register device 14 and 15, which interacts with a register system of the plate-shaped raw form. Thus, the plate edges can be fixed on the strips 10 and 11 in a register-correct manner by means of a pin register 14, 15 of the strips 10 and 11 and an adjustment hole system of the plate-shaped raw form.

In a known manner, the strips 10 and 11 are suction strips with integrated positionable vacuum suction devices for holding the raw form in place. Preferably, the lifting elements 12 and 13 are electric adhesion magnets that can interact with corresponding soft iron cores of the strips 10 and 11. After the suction strips 10 and 11 and lifting elements 12 and 13 are activated, the plate-shaped raw form is held on its upper side, i.e., on the side of the fixing frame 6 opposite to the layout table 4, in a manner such that the raw form is ready for transport.

The fixing frame 6 can be moved into the housing 1 over the curving device 2 by means of the linear drive 7, which can be a cable pull, a gear rod or a chain guide supported on rails. The end positions of the path travelled by the fixing frame 6 inside and outside the housing 1 can be determined, preferably, by means of stops.

The curving device 2 and its function are described in DE 43 11 078 C1. A stationary holding strip 16, as well as a holding strip 17 rotatable around an axis 18 and transversely movable along a slide guide 19, are provided for the plate edges to be connected.

Once the fixing frame 6 has been positioned by means of suitably adjusted holding strips 16 and 17, the strips 10 and 11 of the fixing frame 6 can be electromagnetically attracted, and the plate-shaped raw form can be clamped onto the holding strips 16 and 17.

The empty fixing frame 6 has a range of motion extending from the working area of the apparatus toward the curving device 2 until the housing seal 8 of the fixing frame covers the housing opening 5.

As is known, the holding strips 16 and 17 are positioned at a distance from each other corresponding to the length of the raw form or workpiece to be processed. The raw form can be maintained in a register-correct manner by means of the aforementioned pin register of the strips 10 and 11 of the fixing frame 6 and the adjustment hole system of the raw form. To form the sleeve, the strip 17 is simultaneously rotated and moved transversely toward the stationary strip 16. For this purpose, the strip 17 is constructed on a round table 20, which can be moved in a carriage 21 on the slide guide 19. The strip 17 is thereby moved below the stationary strip 16 and, after a complete rotation, is located opposite to the stationary strip 16, so that the plate edges are also aligned opposite to one another.

At the point where the strips 16 and 17 are oppositely aligned forming a sleeve-type printing form, a welding machine, such as a laser 3 is positioned in the housing 1 above the strips 16 and 17, so that laser cutting and laser welding can be performed on the sleeve-type printing form, as described in DE 43 38 467 C1.

Each of the working steps to produce a sleeve-type printing form, but for the manual placement of the plate-shaped blank from the plate stack onto the layout table 4, can be automatically performed in the apparatus of the invention. A stack of multiple blanks can thereby be placed on the layout table 4.

FIGS. 2 to 11 illustrate the function of the apparatus according to the invention in ten sequential work steps.

Figure 2:
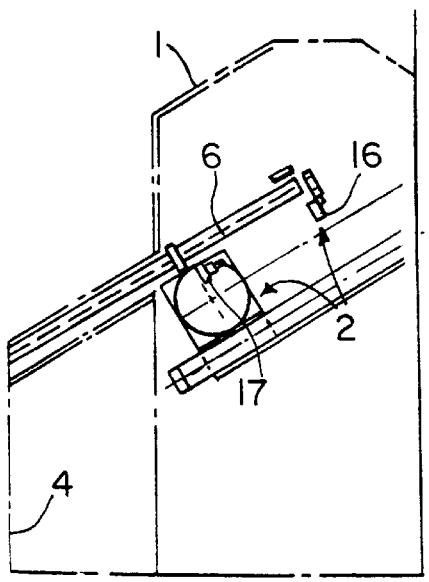
FIGS. 2–11 generally illustrate operation of the apparatus of the invention in ten steps.

FIG. 2 shows the apparatus of the invention in the start position. The fixing frame 6 is positioned in the housing 1, and the curving device 2 is located in the initial position.

Figure 3:
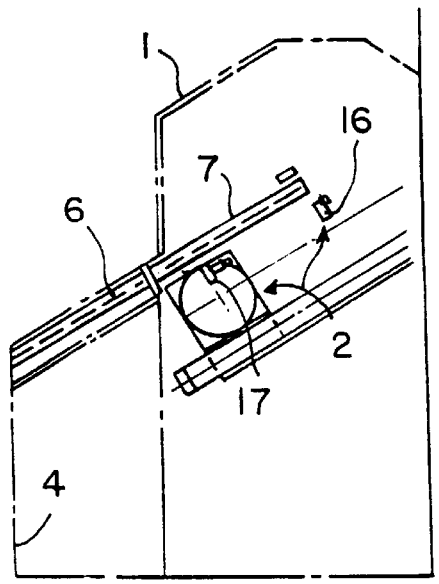

In FIG. 3, the fixing frame 6 is moved out of the housing. A plate-shaped blank that has previously been placed manually on the layout table 4 (or the uppermost of several plate-shaped blanks placed in a stack on the layout table 4) is automatically grasped by the fixing carriage.

Figure 4:
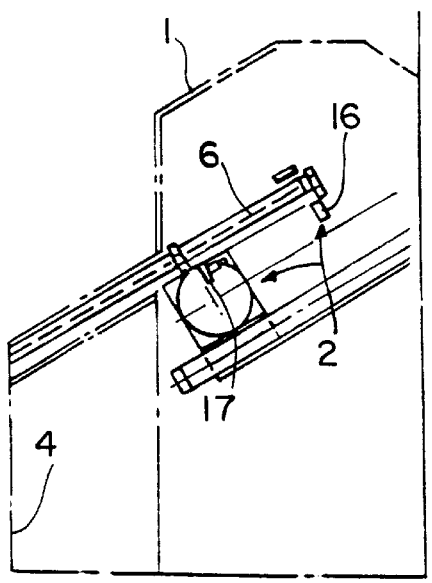
Figure 5:
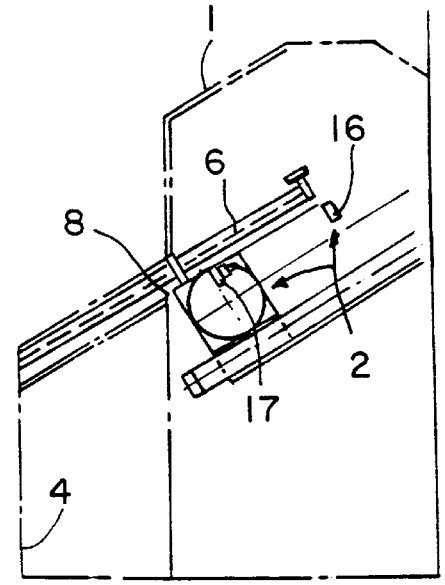

FIG. 4 illustrates the mechanical movement of the plate-shaped workpiece from the fixing carriage 6 onto the curving device 2. In FIG. 5, the fixing carriage 6 is empty, and is moved from the working area of the device in the housing 1 to the curving device 2, this movement causes the closing of the housing opening 5.

Figure 6:
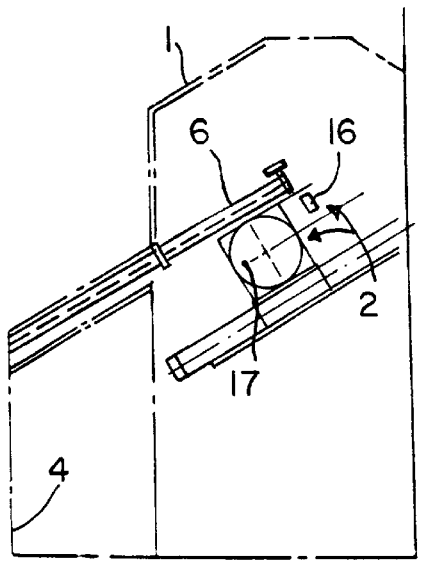
Figure 7:
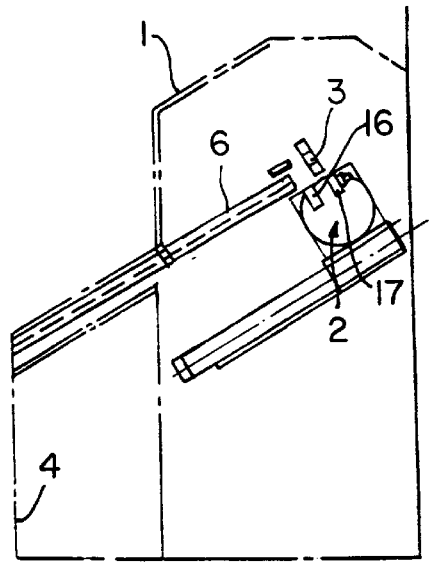

FIG. 6 shows the automatic process of curving the plate-shaped raw form into the sleeve-type printing form, whereby the plate edges of the raw form to be connected are positioned in a register-correct manner to be cut correctly to length. FIG. 7 shows the plate edge of the raw form being cut correctly to length by the laser 3.

Figure 8:
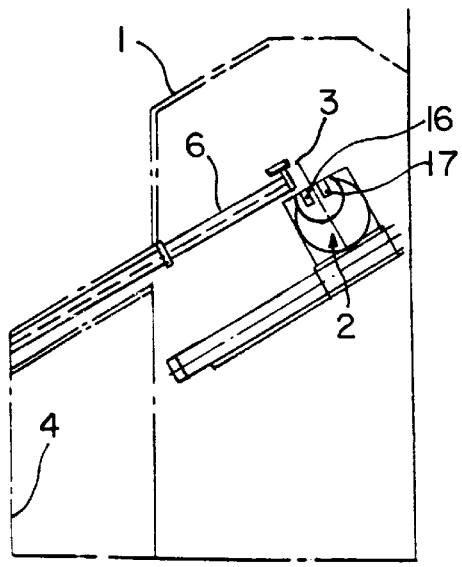
Figure 9:
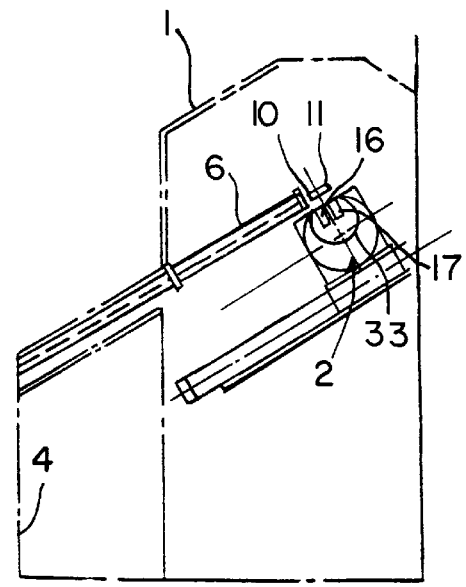

In FIG. 8, the beginning and end of the plate edges of the correctly cut printing form are placed together, and then welded to one another by the laser 3. In FIG. 9, the finished sleeve-type printing form 33 is released, i.e., the sleeve 33 is no longer clamped by the strips 16 and 17, and can be mechanically removed from the housing 1.

Figure 10:
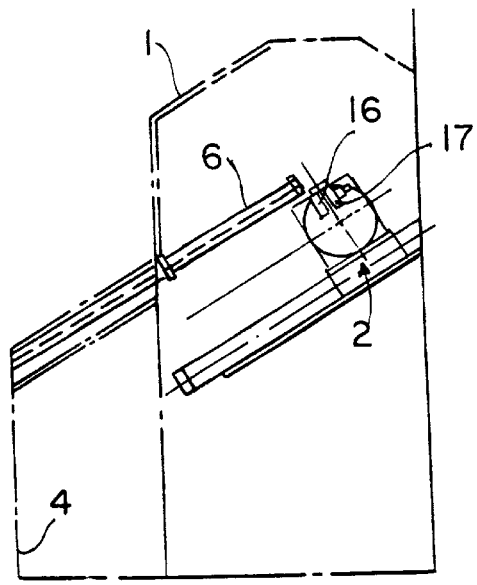
Figure 11:
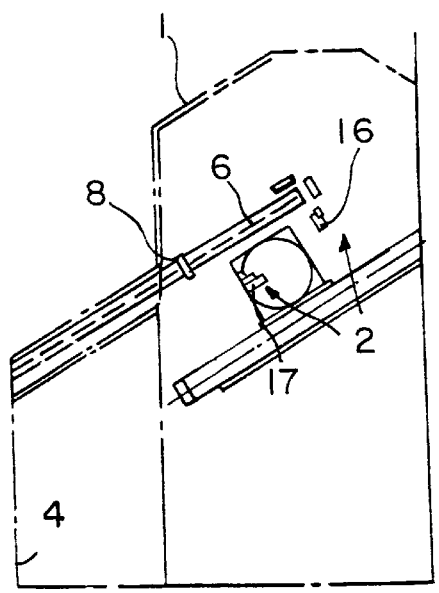

According to FIG. 10, the clamping strips 10 and 11 are again held by the strips 16 and 17 for return to the fixing frame 6. In FIG. 11, the curving device 2 and the fixing carriage 6 again move into the initial position as shown in FIG. 2.

The removal of the finished sleeve-type printing form from the housing 1 can also be performed mechanically. As a result, multiple sequences of the above-described work steps can be carried out automatically. The apparatus for producing a sleeve-type printing form can then be automatically switched off after the depletion of a stack of plate-shaped blanks on the layout table 4.

Again referring to FIG. 1, a conveying mechanism, such as an axially revolving conveyor belt 22, which can be embodied as an O-ring, is provided on the curving device 2. A partial revolution of the conveyor belt 22 is conducted on the strip 17 in such a way that, after the release of the finished sleeve-type printing form clamped to the strips 16 and 17, the sleeve 33, with its inner side as the single support line, rests on the conveyor belt 22 and thus can be conveyed out of the housing 1.

The housing 1 has an aperture 35 (FIG. 12), which can be closed during the production process of the sleeve-type printing form and through which the finished sleeve-type printing form can be removed. The finished sleeve-type printing form 33 (FIG. 12) can be moved by means of the conveyor belt 22 and taken over by a conveyance device 30, which can be brought to the aperture 35 from outside the housing 1.

Figure 12B:
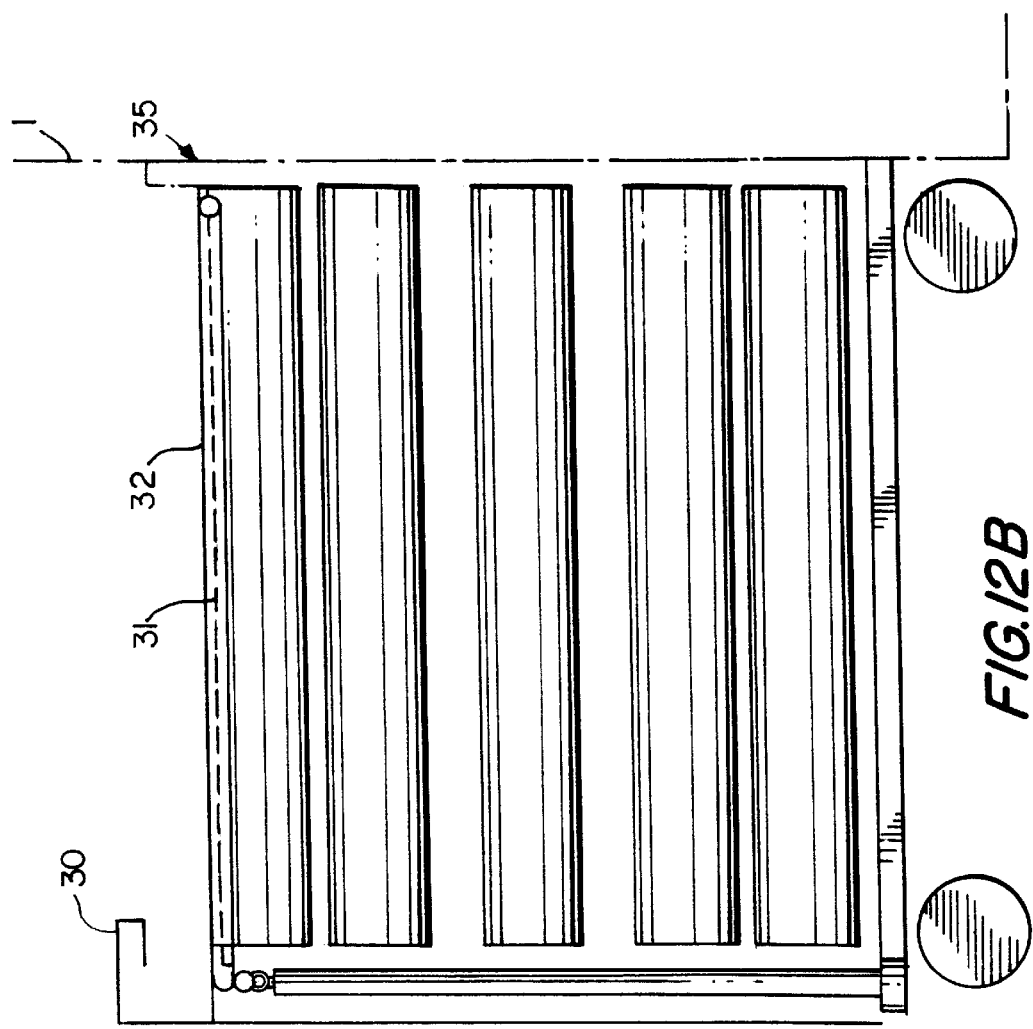
FIG. 12 shows a conveying mechanism for removing sleeve-type printing forms from the housing of an apparatus of the invention.
Figure 12A:
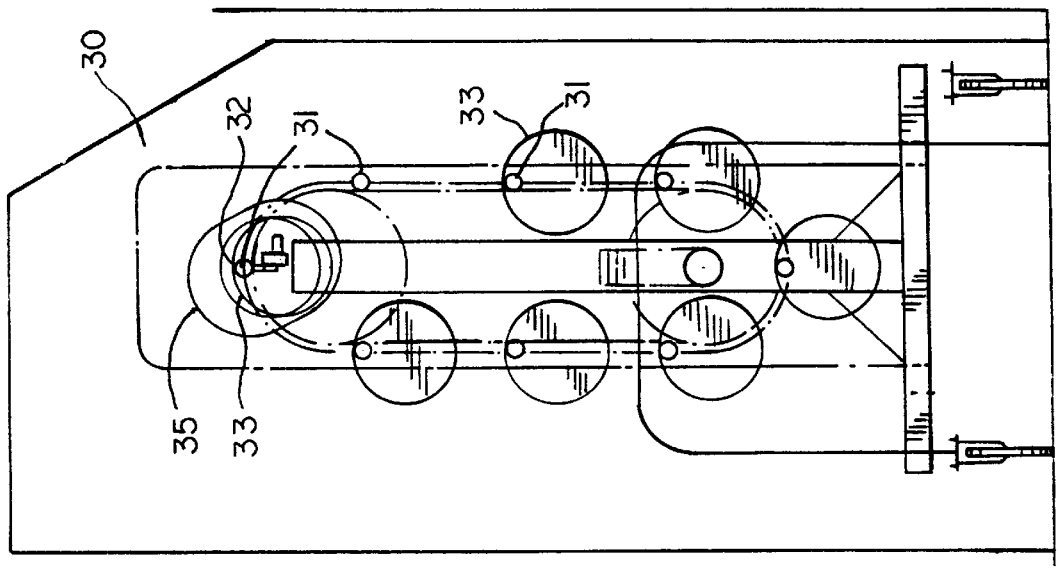

On the left, FIG. 12 shows a front view of the conveyance device 30 at the housing 1. On the right, FIG. 12 shows the conveyance device 30 at the side of the housing 1. In a preferred embodiment, conveyance device 30 is a movable frame, in which are suspended multiple take-over rods 31. The rods 31 can be moved vertically in the manner of a conveyor belt and receive the sleeve-type printing forms 33. When the conveyance device 30 has been brought to the housing window 35, the take-over rods 31 can be aligned with and placed axis-parallel to the holding strips 16 and 17 of the curving device 2 by means of an endless conveyor chain, which runs via cam rollers. Each rod 31 is also equipped with a conveying belt 32, preferably in the form of an O-ring, which revolves in the axial direction, so that the finished sleeve-type printing form 33 can be moved mechanically through the aperture 35 onto a take-over rod 31 of the conveyance device 30, which rod 31 is aligned with at least one of the holding strips 16 and 17.

In the illustrated embodiment, the conveyance device 30 can accommodate up to eight finished printing forms and be moved manually to the printing machine. However, the conveyance device 30 can be moved automatically between the device for producing the printing forms and the printing machine.

After the sleeve-type printing forms have been taken onto the rods, the welded seams can again be rolled down in the conveyance device, to ensure that these seams are completely even with the remaining surface of the printing form.

The terms and expressions which have been employed are used as terms of description and not of limitation, and there is no intention in the use of such terms and expressions of excluding any equivalent of the features shown and described or portions thereof, it being recognized that various modifications are possible within the scope of the invention.

We claim:

1. An apparatus for producing a sleeve-type printing form from a plate-shaped blank having edges, comprising
    a housing having an opening, said housing being in the form of a radiation protective casing;

a size adjustable fixing frame for fixing the plate-shaped blank as a flat raw form and transporting said raw form, said fixing frame having a path of motion and being movable between positions within and out of the housing to transport said form from a supply position external to the housing by means of a linear drive for the register-correct accommodation of the raw form;

a curving device for curving the raw form, said curving device being housed in said housing and receiving said raw form from said fixing frame;

a welding machine located in said housing by means of which the plate edges of the printing form are welded by means of a laser beam to produce the printing form;

a layout table external to the housing for supplying the plate shaped raw form, said layout table being positioned below said housing opening;

a seal for closing said housing opening in a radiation-proof manner, said seal cooperating with said fixing frame;

said housing having a closable aperture through which the finished printing form sleeve can be moved out of the housing by a conveyance mechanism.

2. The apparatus of claim 1 wherein multiple plate-shaped blanks are stacked on the layout table and the respective uppermost blank is picked up from the stack by the fixing frame and after depletion of the stack, said fixing frame is automatically switched off.

3. The apparatus of claim 1 wherein the fixing frame further comprises a housing seal that fills and closes the opening of the housing in a radiation-proof manner.

4. The apparatus of claim 1 wherein the fixing frame further comprises adjustable holding strips positioned relative to one another so as to match the distance between the plate edges to be connected on a carriage and placed longitudinally on the respective plate edges.

5. The apparatus of claim 1 wherein the holding strips comprise a register device which interacts with a register system of the plate-shaped raw form on the layout table.

6. The apparatus of claim 4 wherein the linear drive of the fixing frame is designed in such a way that the curving device, along with the raw form held in a register-correct manner, can be moved over by the raw form and the raw form can be placed in a register-correct manner in the curving device.

7. The apparatus of claim 1 wherein the curving device has a stationary holding strip and a holding strip located on a rotatable and transversely movable circular table.

8. The apparatus of claim 1 wherein the raw form is positionable on the holding strips by means of the fixing frame.

9. The apparatus of claim 7 wherein upon a full rotation and simultaneous transversal movement of the circular table in the direction of the stationary strip, the strips, forming a sleeve, are positioned for the measurement-correct cutting to length and welding of the plate edges.

10. The apparatus of claim 1 wherein the welding machine is a laser positioned in the housing above the curving device, so that laser cutting and laser welding can be performed mechanically.

11. The apparatus of claim 1 further comprising stops for determining the end positions of the fixing frame path of motion.

12. The apparatus of claim 1 wherein at least one revolving conveyor belt is provided on at least one of the holding strips of the curving device for conveying the sleeve-type printing form in the axial direction in the case of which a partial revolution can be brought into contact with the inner surface of the finished printing form sleeve.

13. The apparatus of claim 1 further comprising a conveyance device mechanically movable from outside of the housing to the housing aperture for the removal of the finished printing form sleeve from the housing.

14. The apparatus of claim 1 wherein the conveyance device has multiple take-over rods positionable axis-parallel to, and aligned with, the holding strips of the curving device.

15. The apparatus of claim 1 wherein each rod is equipped with a device running in the axial direction, such as a conveyor belt, so that the printing form sleeve can be mechanically placed on a rod brought into position through the aperture of the housing.

16. The apparatus of claim 1 wherein the conveyor belts are revolving O-rings.

* * * * *